(12) United States Patent
Ertel et al.

(10) Patent No.: US 10,489,941 B2
(45) Date of Patent: Nov. 26, 2019

(54) RECONSTRUCTION OF AN IMAGE DATA SET FROM MEASUREMENT DATA OF AN IMAGE CAPTURING DEVICE

(71) Applicants: Dirk Ertel, Forchheim (DE); Yiannis Kyriakou, Spardorf (DE)

(72) Inventors: Dirk Ertel, Forchheim (DE); Yiannis Kyriakou, Spardorf (DE)

(73) Assignee: Siemens Healthare GmbH, Erlangen (DE)

( * ) Notice: Subject to any disclaimer, the term of this patent is extended or adjusted under 35 U.S.C. 154(b) by 178 days.

(21) Appl. No.: 15/640,762

(22) Filed: Jul. 3, 2017

(65) Prior Publication Data

US 2018/0005416 A1    Jan. 4, 2018

(30) Foreign Application Priority Data

Jul. 4, 2016 (DE) .......................... 10 2016 212 116

(51) Int. Cl.
  *G06K 9/00*    (2006.01)
  *G06T 11/00*   (2006.01)
  *G06K 9/62*    (2006.01)
  *G06T 7/00*    (2017.01)

(52) U.S. Cl.
  CPC .......... *G06T 11/006* (2013.01); *G06K 9/6202* (2013.01); *G06T 7/0012* (2013.01);
  (Continued)

(58) Field of Classification Search
  CPC ................. G06T 11/006; G06T 7/0012; G06T 2207/10116; G06T 2207/10088; G06K 9/6202
  (Continued)

(56) References Cited

U.S. PATENT DOCUMENTS

2009/0175523 A1* 7/2009 Chen ..................... G06T 11/006
                                                         382/130
2010/0207629 A1* 8/2010 Trzasko .............. G01R 33/561
                                                         324/309
(Continued)

OTHER PUBLICATIONS

Basu, S. et al: "O(N2 log2 N) Filtered Backprojection Reconstruction Algorithm for Tomography"; IEEE Transactions on Image Processing, vol. 9, Oct. 2000, pp. 1760-1773; 2000.
(Continued)

*Primary Examiner* — Van D Huynh
(74) *Attorney, Agent, or Firm* — Lempia Summerfield Katz LLC

(57) ABSTRACT

A method for reconstructing an image data set from magnetic resonance data is provided. First measurement data is captured using an image capturing device. The first measurement data is captured using temporal and/or spatial subsampling and is used for reconstructing the image data set with a compressed sensing algorithm in which a boundary condition that provided agreement with the measurement data and a target function that is used in an iterative optimization. The compressed sensing algorithm evaluates candidate data sets for the image data set are used. In the reconstruction using the compressed sensing algorithm, in addition to the first measurement data, second measurement data that is captured by a second imaging modality that is different from the first imaging modality of the first measurement data but by the same image capturing device. The second measurement data is registered to the first measurement data, by a modification of the boundary condition and/or target function.

15 Claims, 2 Drawing Sheets

(52) U.S. Cl.
CPC .............. *G06T 2207/10088* (2013.01); *G06T 2207/10116* (2013.01)

(58) Field of Classification Search
USPC ........................................................ 382/131
See application file for complete search history.

(56) References Cited

U.S. PATENT DOCUMENTS

| | | | | |
|---|---|---|---|---|
| 2011/0142316 A1* | 6/2011 | Wang | .................... | G06T 11/006 382/131 |
| 2011/0293158 A1* | 12/2011 | Popescu | ................. | A61B 5/055 382/131 |
| 2018/0249979 A1* | 9/2018 | Wang | .................... | A61B 5/0035 |

OTHER PUBLICATIONS

Bergner, F. et al: "An investigation of 4D cone-beam CT algorithms for slowly rotating scanners"; Medical Physics; vol. 37; 2010; pp. 5044-5053.; 2010.

Chambolle, A.: "An algorithm for total variation minimization and applications"; Journal of Mathematical Imaging and Vision, vol. 20; pp. 89-97.; 2004.

Chen, Guang-Hong et al: "Prior image constrained compressed sensing (PICCS): A method to accurately reconstruct dynamic CT images from highly undersampled projection data sets", in: Medical Physics, Feb. 2008, vol. 35, No. 2, pp. 660-663, XP007907066, ISSN: 0094-2405, DOI:10.1118/1.2836423.

Cu, X. et al: "Total Variation Minimization-Based Multimodality Medical Image Reconstruction"; Proc. of SPIE; Val. 9212; pp: 921210-1-921210-11.; 2014.

German Office Action for related German Application No. 10 2016 212 116.2 dated May 16, 2017.

Lustig, Michael et al.: "Sparse MRI: The Application of Compressed Sensing for Rapid MR Imaging", Magnetic Resonance in Medicine 58; pp. 1182-1195, 2007; vol. 58; No. 6; XP007907974; ISSN: 0740-3194; DOI: 10.1002/MRM.21391; 2007.

Yan Xi, Jun Zhao et al: "Simultaneous CT-MRI Reconstruction for Constrained Imaging Geometries Using Structural Coupling and Compressive Sensing"; IEEE Transactions on Biomedical Engineering; vol. 63; Jun. 2016; pp. 1301-1309.

\* cited by examiner

RECONSTRUCTION OF AN IMAGE DATA SET FROM MEASUREMENT DATA OF AN IMAGE CAPTURING DEVICE

CROSS REFERENCE TO RELATED APPLICATIONS

This application claims the benefit of DE 10 2016 212116.2 filed on Jul. 4, 2016 which is hereby incorporated by reference in its entirety.

FIELD

Embodiments relate to a method for reconstructing an image data set.

BACKGROUND

Magnetic resonance imaging (MRI) is established as a medical imaging modality. MRI provides a number of significant advantages but also entails various restrictions. One of these restrictions is that in many cases magnetic resonance capture procedures take a relatively long time, with the possibilities of accelerated image acquisition being severely limited. If it is crucial to achieve good temporal resolution, the temporal scanning rates of magnetic resonance imaging are often limited and include specific disadvantages and/or require very complex procedures.

The temporal scanning rate of magnetic resonance imaging is primarily a function of the magnetic resonance sequence used, where specific gradient echo (GRE) magnetic resonance sequences are predominantly used.

Initially in relation to target imaging modalities, the concept of compressed sensing may be used. Compressed sensing is a reconstruction technique that may be applied to measurement data of an imaging modality that has been subject to temporal and/or spatial subsampling. Compressed sensing is based on the observation that not only natural images—e.g. photographs—may be subjected to compression with little or no visible loss of information, but also that medical images may also be subject. If the images that are to be captured are compressible, most transform coefficients may be left out of account or are insignificant. As such, it is not necessary to capture all the measurement data. The mathematical theory for compressed sensing provides the possibility of reconstructing, from subsampled measurement data, image data sets that are still largely free of artifacts even if the Nyquist criterion is not fulfilled.

With compressed sensing, instead of the direct reconstruction of the image data set, a sparse version of the image data set may be reconstructed, in which substantially fewer image elements contain significant image values. The mathematical principle of compressed sensing is that the candidate data set for the image data set in which the $l_1$ norm is at a minimum will be the correctly reconstructed data set of the candidate data sets for the data that results when a measurement operator that maps measurement of the measurement data is applied to the candidate data set. Using an optimization method, for example a minimization method, the candidate data set for which the target function containing the $l_1$ norm of the sparse version of the candidate data set is at a minimum may be identified, given the boundary condition that the measurement data results again from the image data set under the measuring conditions.

In order to generate sparse versions of the candidate data set, various transforms, called "sparsifying operators" are used. If, for example, a gradient operator is applied to a candidate data set, the only remaining significant pixels are the edges visible in the candidate data set. The result is markedly sparser than the original candidate data set. Other frequently used examples of sparsifying operators are wavelet transforms. The application of a sparsifying operator corresponds substantially to mapping the image values of the candidate data set onto a sparse vector of coefficients that are associated with the corresponding basis functions of the sparsifying operator.

A paper by Michael Lustig et al., "Sparse MRI: the Application of Compressed Sensing for Rapid MR Imaging", *Magnetic Resonance in Medicine* 58:1182-1195 (2007), describes the application of compressed sensing to accelerated magnetic resonance imaging. There, the sparsity that is implicit in MR images is exploited, where implicit sparsity is meant as transform sparsity, i.e. the underlying object in the magnetic resonance imaging that is to be imaged in the image data set has a sparse representation in a known and fixed mathematical transform domain. Here, "sparsity" referred to that there are relatively few significant pixels with nonzero values, that may also equally well be meant in a temporal dimension. However, the degree of possible subsampling in magnetic resonance is still limited, for example if a certain spatial resolution is to be maintained, since shortening the capture time or the temporal scanning rate of magnetic resonance imaging continues to result in a deterioration in the spatial resolution. Even if compressed sensing is used, the possibility of accelerating magnetic resonance imaging is thus limited.

Compressed sensing has also already been proposed for other medical imaging modalities, such as computer tomography, for example in an article by Guang-Hong Chen et al., "Prior image constrained compressed sensing (PICCS): a method to accurately reconstruct dynamic CT images from highly undersampled projection data sets", *Medical Physics* 35: 660-663 (2008). The article refers to dynamic CT imaging in which streaking artifacts occur if the Shannon/Nyquist requirements are not satisfied. Accordingly, the compressed sensing approach is extended in that the temporal change in the CT measurement data is not taken into account and a prior image is generated as an additional boundary condition. There are also constraints in computer tomography and other medical imaging modalities as to the degree to which subsampling is possible while allowing compressed sensing.

SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide an extension to the compressed sensing approach that allow for a greater degree of temporal and/or spatial subsampling for measurement data of an imaging modality, for example magnetic resonance imaging.

In an embodiment, a method is provided using the compressed sensing algorithm, first measurement data, and second measurement data that is captured by a second imaging modality that is different from the first imaging modality of the first measurement data and is registered to the first measurement data, by a modification of the boundary condition and/or target function.

Embodiments allow for compensation for specific constraints of one imaging modality using image information from the other imaging modality. The imaging modality of the first measurement data, for example, a further acceleration in the acquisition, and/or, for example in the case of X-ray imaging as the first imaging modality, further reduces a radiation dose to which a patient is exposed if the measurement data relates to a target region of the patient that is to be captured.

In an embodiment, the second measurement data also is captured using the image capturing device by which the first measurement data is captured. A two-modality image capturing device is used, that provides first measurement data of the first imaging modality and second measurement data of the second imaging modality to be captured. The two-modality image capturing device leads to an improvement in the image quality of the image data set, since the acquisition of the multiple-modality image data sets is characterized primarily by a minimal temporal and spatial offset, and registration is already included as a fundamental feature of the construction.

The first measurement data is magnetic resonance data and the second measurement data is X-ray data, for example, computer tomography data. The first imaging modality is magnetic resonance and the second imaging modality is X-ray imaging. Constraints that are specific to magnetic resonance may be compensated by image information from the X-ray imaging, with rapid image acquisition. A combined magnetic resonance and X-ray device may be used as the image capturing device, for example, a combined magnetic resonance and computer tomography device. A higher temporal scanning rate may be achieved for the magnetic resonance images, with a sufficient spatial resolution still being maintained. Embodiments provide fundamental constraints in magnetic resonance imaging to be eliminated, and applicability in the medical environment to be markedly extended. Image artifacts and constraints on the image quality are markedly reduced.

While, embodiments provide an improvement in the magnetic resonance imaging, for example a further acceleration in the magnetic resonance imaging, embodiments further may include other imaging modalities, for example ultrasound imaging or similar.

Known compressed sensing algorithms may be used for the $l_1$ norm of a reconstructed candidate data set that has been sparsified as described by applying a sparsifying operator to be used as at least part of the target function that is to be iteratively minimized, where the boundary condition includes producing the first measurement data by applying to the candidate data set a measurement operator that maps measurement of the first measurement data.

For concrete cases of incorporation of the second measurement data into the reconstruction in the compressed sensing algorithm, the method may use virtual measurement data of the first imaging modality to be determined from the second measurement data and/or for virtual measurement data of the second imaging modality to be determined from the current candidate data set and/or for a virtual comparison data set of the first imaging modality, that is associated with the current candidate data set, to be determined from the second measurement data. Embodiments thus provide for converting measurement data and/or images, on the basis of known properties of the imaging modalities, into data that corresponds to the respectively other imaging modality. For example, for a transform of data between magnetic resonance imaging and X-ray imaging, databases may be used that map typical magnetic resonance values, such as proton density, relaxation times and similar, onto attenuation times for X-ray radiation and vice versa, such that a conversion may be carried out. If measurement data, such as concrete projections, is to be derived, the corresponding measurement operators have to be applied that for magnetic resonance imaging include a Fourier transform to k space and/or for X-ray imaging include the system matrix including the capture geometry. A modification in the boundary condition may also require the candidate data sets to agree with the second measurement data, or intermediate data sets that are reconstructed from the second measurement data to be integrated into the target function, for example by a further sparsifying of the candidate data set in an additional term in which the difference between the intermediate data set and the candidate data set, or to be more precise the $l_1$ norms thereof, is taken into account.

Concrete exemplary embodiments of a main application of the present invention, specifically first measurement data of magnetic resonance imaging and second measurement data of X-ray imaging, will now be presented, although these may in principle also be transferred to other combinations of modalities.

An embodiment with X-ray data and magnetic resonance data provides, for X-ray data in the boundary condition, a Radon transform to be applied to a three-dimensional X-ray attenuation value set that has been derived from the current candidate data set of the iterative procedure and for the virtual projections that are obtained to be compared with the X-ray data. The Radon transform is selected such that the capture geometries that were also used to capture the X-ray data as the second measurement data are produced. The already known compressed sensing reconstruction method is applied in the manner also described in the publications cited in the introduction; e.g. at least the $l_1$ norm of the candidate data sets to which the sparsifying operator was explicitly or implicitly applied continues to be minimized in the target function, but in each case the boundary condition is changed, for example, to provide for the boundary condition to require the sum of deviations of the magnetic resonance data from comparison data that results from applying a measurement operator that maps the measurement of the first image data and includes a Fourier transform onto the candidate data set, and the X-ray data of the virtual projections, to lie within a tolerance range. An optimization in relation to the multimodal measurement data is ensured. The reconstructed candidate data that has undergone Fourier transform is adjusted to the actual magnetic resonance data, e.g. to the k space samples. An adjustment is also to be made to the X-ray data, in concrete terms the projection data. Virtual X-ray measurement data is generated from the candidate data of the current candidate data set, where appropriate procedures are known from the prior art, utilizing a database that maps attenuation values and magnetic resonance data onto one another. From these virtual attenuation values corresponding virtual projections are calculated by performing a Radon transform of the virtual attenuation values whereof the direction of projection corresponds to that of the actual X-ray data. S deviation of the current candidate data set from the actual measurement data of both the magnetic resonance imaging and the X-ray imaging is calculated. The combined deviation is not to exceed a specific threshold value that defines a tolerance range.

In an embodiment, the tolerance range is selected as a function of the noise properties of the magnetic resonance data and the X-ray data. With magnetic resonance imaging alone, the size of a threshold value that defines the tolerance range is selected as a function of the noise level of the measurement data, e.g. the magnetic resonance data. However, in an embodiment, a combined boundary condition for the corresponding determination of a suitable threshold value, both the noise level of the magnetic resonance data and the noise level of the X-ray data be taken into account, where the noise behavior of the simulation of the virtual projections may also be taken into account and consequently the transform using a database, the Radon transform and where appropriate other measures that are used.

An embodiment that may be used as an alternative or in addition provides, when using the X-ray data in the target function, either for a comparison data set for the candidate data set to be determined by reconstructing a three-dimensional intermediate data set from the X-ray data and mapping the attenuation values of the intermediate data set onto magnetic resonance values, or for virtual projections to be determined by applying a Radon transform to a or to the three-dimensional X-ray attenuation value set that is derived from the current candidate data set of the iterative procedure. The comparison data set or the virtual projections may then be used to modify the target function, in order to take into account the X-ray data.

The target function may be defined as a weighted sum of the $l_1$ norm of a difference either between the candidate data set and the comparison data set or between the virtual projections and the X-ray data—the difference to which a first sparsifying operator was applied—and the $l_1$ norm of the candidate data set, to which a second sparsifying operator was applied. The $l_1$ norm of the sparse candidate data set continues to be minimized, but a term that is additionally to be minimized and that is formed in a first variant as the difference between the candidate data set and the comparison data set is added. For example, when using an X-ray system of the combined image capturing device, X-ray data is generated, after which, in order to ensure a suitable adjustment within the optimization algorithm, virtual magnetic resonance image data is generated from the X-ray data, in the form of the comparison data set. Appropriate procedures are in principle known from the prior art, as discussed above, and may use for example a database linking X-ray attenuation values and magnetic resonance values. The X-ray data may be reconstructed into a three-dimensional intermediate data set (with X-ray attenuation values). The X-ray data may not be reconstructed into a three-dimensional intermediate data set in the second variant, as the X-ray data may be applied to the projection plane directly. Virtual projections are derived from the candidate data set in relation to modifying the boundary condition, for example using the database and the Radon transform, whereof at least one projection direction or, for example, the capture geometry agrees with the X-ray data that is actually measured.

In both variants, the deviation of the current candidate data set from the actual second measurement data of the X-ray imaging is taken into account. Within the compressed sensing algorithm a suitable adjustment of the first and second measurement data is used to provide that the iterative reconstruction is adapted using the sparsifying operator.

A weighting coefficient that describes the weighting to the sum may depend on the result that is ultimately sought, e.g. what the image data set is primarily intended to depict. If the temporal resolution is important, the adjustment term with the X-ray data may be weighted to a lesser extent than in cases in which the spatial resolution, that is coded mainly in the X-ray data, is also relevant. If, for example, a four-dimensional image data set of a ventricle is to be obtained, both the temporal and the spatial resolution are important, so there must be a configuration such that for example a term bringing about adjustment to the X-ray data is weighted by approximately 30-50%.

There is a further degree of freedom for optimizing the image data set if the selection of the sparsifying operators is different, e.g. that the first and second sparsifying operators may be selected differently in order to optimize the quality of the image data set, for example, in order to compensate for the disadvantages of the imaging modalities. For example, if acquisition of the magnetic resonance data is to be accelerated, the spatial resolution will be relatively low, where in X-ray imaging, for example computer tomography, spatial resolution is good. Accordingly, the sparsifying operators may be derived, for example, in respect of their spatial and temporal components, such that the properties, thus the temporal and spatial resolution of the individual imaging modalities, are taken into account in the terms containing the measurement data of the modalities.

Wavelet transforms are used as the sparsifying operators.

Embodiments provide an image capturing device including a controller. The image capturing device may be a combined magnetic resonance and X-ray device and may provide both magnetic resonance imaging and X-ray imaging in mutually registered coordinate systems. The controller includes a compressed sensing unit that is configured to use a compressed sensing algorithm taking into account the second image data, for example, the X-ray data.

Embodiment further provide a computer program that may be loaded directly to the memory of a processing device, for example, a controller of an image capturing device, and that has programming in order to perform the steps of the method when the computer program is executed in the processing device, e.g. the controller of the image capturing device. The computer program may be stored on an electronically readable data medium, that may include electronically readable control information that is stored thereon and includes at least the computer program and takes a form such that, when the data medium is used in a processing device, e.g. the controller of the image capturing device, the control information executes a method that is described therein. The data medium may favorably take the form of a non-transitory data medium, for example a CD-ROM.

DETAILED DESCRIPTION

In an embodiment, the first measurement data is magnetic resonance data and the second measurement data is X-ray data, with all of the measurement data captured by the same image capturing device. A further acceleration of the magnetic resonance imaging is provided by further subsampling. Disadvantages that arise in magnetic resonance imaging are compensated by the X-ray imaging that is carried out simultaneously. The X-ray data is additionally incorporated into the compressed sensing algorithm that is extended.

Figure 1:
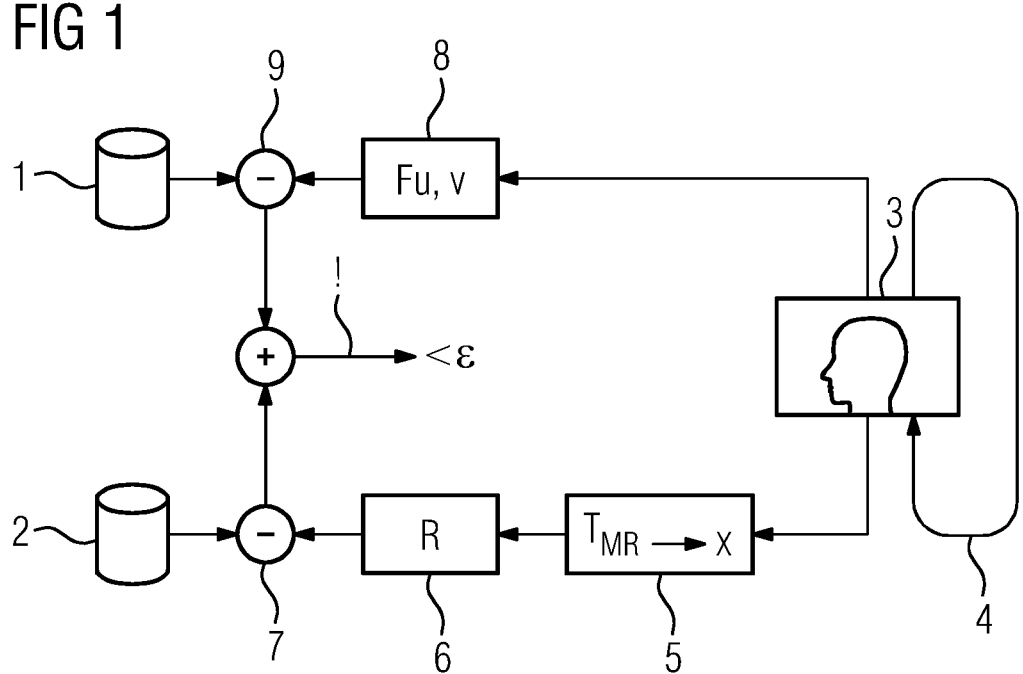
FIG. 1 depicts a flowchart of an embodiment.

FIG. 1 depicts relationships and procedures in an embodiment of the method where the X-ray data is taken into account in a boundary condition of the compressed sensing algorithm.

The starting point is the magnetic resonance data 1 and the X-ray data 2. Candidate data sets 3 only from the magnetic resonance data 1 are used in the context of the iterative reconstruction that is indicated by the arrow 4, to minimize the target function. The optimization method for determining the image data set x may be formulated as follows:

$$x = \underset{z}{\operatorname{argmin}}(\|\psi z^{MR}\|_1), \quad (1)$$

where $z^{MR}$ represents the candidate data sets, e.g. magnetic resonance images in the position space, and $\psi$ represents the sparsifying operator used, for example a wavelet transform.

Modified in relation to a currently available compressed sensing algorithm, the boundary condition is:

$$s.t. \|F\{z^{MR}\} - y_{MR}\|_2 + \|R\{z^{MR}_{virtual\ x-ray}\} - y_{x-ray}\|_2 \leq \varepsilon, \quad (2)$$

into which the X-ray data 2 is also incorporated, as in formula (2) and FIG. 1. In formula (2), $y_{MR}$ represents the first measurement data, e.g. the magnetic resonance data 1, as k space samples. $Y_{x-ray}$ represents the second measurement data, e.g. the X-ray data 2, in the projection space. F represents a Fourier transform and R a Radon transform, and ε represents a specific threshold value that defines a tolerance range within which the current candidate data set $z^{MR}$ must agree with the measurement data.

As depicted in FIG. 1, for the boundary condition to be evaluated, a transform 5 is applied to the candidate data set 3 to obtain a virtual X-ray attenuation value set, that is designated $z^{MR}_{virtualx-ray}$ in the formula. A database may store attenuation values that are associated with magnetic resonance values. The X-ray attenuation value set undergoes a Radon transform 6 in respect of the projection directions in which there is X-ray data 2. Virtual projections are produced that may be compared with the X-ray data 2 in the boundary condition by subtraction 7. In an analogous manner, by applying a Fourier transform 8 as the measurement operator to the candidate data set 3, comparison data may be determined that may be compared with the magnetic resonance data 1, similarly by subtraction 9. The threshold value E, that defines the tolerance range in which deviations in the two comparisons may be present, is selected as a function of the noise level of the magnetic resonance data 1, the X-ray data 2 and the transforms 5, 6.

Figure 2:
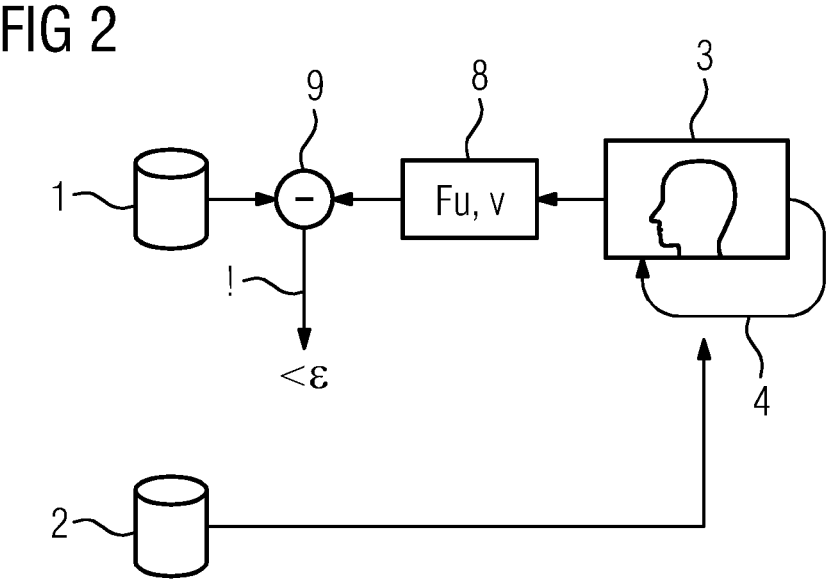
FIG. 2 depicts a flowchart of an embodiment of the method according to the invention.

FIG. 2 depicts an embodiment in which the X-ray data 2 is directly included in the iterative reconstruction, symbolized by an arrow 4, when the target function is changed. Only the magnetic resonance data is used in the boundary condition. There are two different variants of how the X-ray data 2 may be incorporated in the target function. In the first variant, the optimization may be described by the following:

$$x = \underset{z}{\operatorname{argmin}}\left(\alpha \left\|\psi_1\left(z^{MR} - z^{x-ray}_{virtual\ MR}\right)\right\|_1 + (1-\alpha)\|\psi_2 z^{MR}\|_1\right) \quad (3)$$

$$s.t. \|F\{z^{MR}\} - y_{MR}\|_2 \leq \varepsilon,$$

where $z^{x-ray}_{virtual\ MR}$ represents a comparison data set derived from the X-ray data, α represents a weighting parameter, and $\psi_1$ and $\psi_2$ are sparsifying operators. The comparison data set is determined by a reconstruction of a three-dimensional intermediate data set from the X-ray data 2 and mapping of the attenuation values of the intermediate data set onto magnetic resonance values. An alternative variant that permits direct use of the X-ray data 2, may be expressed as:

$$x = \underset{z}{\operatorname{argmin}}\left(\alpha \left\|\psi_1\left(R\{z^{MR}_{virtual\ x-ray}\} - y^{x-ray}\right)\right\|_1 + (1-\alpha)\|\psi_2 z^{MR}\|_1\right) \quad (4)$$

$$s.t. \|F\{z^{MR}\} - y_{MR}\|_2 \leq \varepsilon,$$

where $z^{MR}_{virtualx-ray}$ represents an X-ray attenuation value set derived from the candidate data set 3, as described above. The projection directions of the Radon transform correspond to the projection directions of the actual X-ray data. Virtual projections are determined, but are incorporated directly into the target function, in that—as in formula (4)—a weighted sum of two terms is formed, in a manner analogous to formula (3). The weighting factor α is selected in accordance with the result that is sought. For example, if the temporal resolution is given particular importance, α may be selected to be relatively small, but then if the spatial resolution becomes more important α may also be selected to be correspondingly larger, with the result that a greater proportion of the good spatial resolution from X-ray data 2 is incorporated into the iterative reconstruction.

The sparsifying operators $\psi_1$ and $\psi_2$ may also be selected differently in order to compensate for constraints in the modalities. The corresponding advantages of the imaging modalities, e.g. specifically temporal resolutions and spatial resolutions, are emphasized by focusing on them in the sparsifying.

Figure 3:
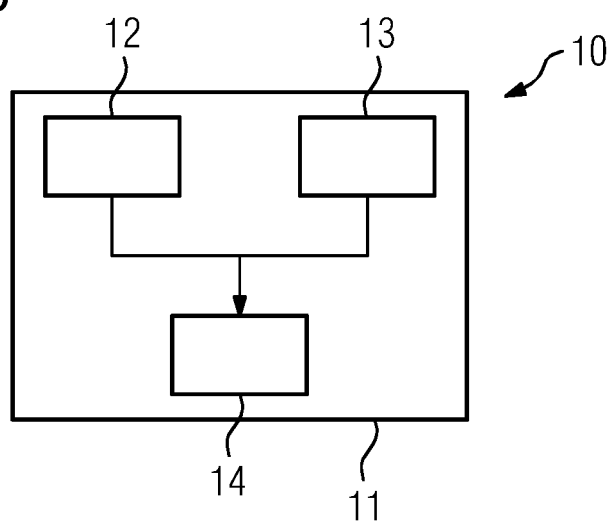
FIG. 3 depicts an image capturing device according to an embodiment.

FIG. 3 depicts an image capturing device 10, for example, a combined magnetic resonance and X-ray device 11. The image capturing device 10 includes as subsystems an X-ray system 12, e.g. a computer tomography system, and a magnetic resonance system 13 that provide the imaging of X-rays and magnetic resonance respectively. The coordinate systems are registered to one another. Additionally, the main magnet unit of the magnetic resonance system 13 may be divided into two in the center to provide space for a computer tomography gantry of the X-ray system 12.

Operation of the image capturing device 10 is controlled by a controller 14.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for reconstructing an image data set, the method comprising:
   capturing first measurement data with a two-modality image capturing device with a first image modality using temporal, spatial, or temporal and spatial sub-sampling;
   capturing second measurement data with the two-modality image capturing device with a second imaging modality that is different than the first image modality, wherein coordinate systems of the first image modality and second image modality are registered to one another; and reconstructing the image data set using a compressed sensing algorithm including a boundary condition and a target function, wherein the boundary condition provides agreement with the first and second measurement data and the target function is used in an iterative optimization and evaluates one or more candidate data sets for the image data set.

2. The method of claim 1, wherein the compressed sensing algorithm comprises a $l_1$ norm of a reconstructed candidate data set that has been sparsified by applying a sparsifying operator as at least part of the target function that is to be iteratively minimized, wherein the boundary condition includes producing the first measurement data by applying to the candidate data set a measurement operator that maps measurement of the first measurement data.

3. The method of claim 1, wherein, for incorporation into the reconstruction, virtual measurement data of the first imaging modality is determined from the second measurement data, virtual measurement data of the second imaging modality is determined from the current candidate data set, and a virtual comparison data set of the first imaging modality, that is associated with the current candidate data set is determined from the second measurement data.

4. The method of claim 1, wherein the second measurement data is X-ray data.

5. The method of claim 4, wherein the boundary condition includes a Radon transform applied to a three-dimensional X-ray attenuation value set that has been derived from a current candidate data set of the iterative optimization, and virtual projections that are obtained are compared with the X-ray data.

6. The method of claim 5, wherein the boundary condition is a function of the sum of deviations of the magnetic resonance data from comparison data that results from applying a measurement operator that maps the measurement of the first image data and includes a Fourier transform onto the candidate data set, and the X-ray data of the virtual projections, lies within a tolerance range, the tolerance range selected as a function of the noise properties of the magnetic resonance data and the X-ray data.

7. The method of claim 1, wherein for the target function, either a comparison data set for the candidate data set is determined by reconstructing a three-dimensional intermediate data set from the second measurement data and mapping the attenuation values of the intermediate data set onto magnetic resonance values, or virtual projections are determined by applying a Radon transform to the three-dimensional X-ray attenuation value set that is derived from the current candidate data set of the iterative optimization procedure.

8. The method of claim 6, wherein the target function is defined as a weighted sum of a $l_1$ norm of a difference either between the candidate data set and the comparison data set or between the virtual projections and the second measurement data, to which difference a first sparsifying operator was applied, and a $l_1$ norm of the candidate data set, to which a second sparsifying operator was applied.

9. A two-modality image capturing device comprising:
a magnetic resonance device configured to acquire first measurement data using temporal, spatial, or temporal and spatial sub sampling;
an X-ray device configured to acquire second measurement data; and
a controller configured to reconstruct an image data set using a compressed sensing algorithm including a boundary condition and a target function, wherein the boundary condition provides agreement with the first and second measurement data and the target function is used in an iterative optimization and evaluates one or more candidate data sets for the image data set.

10. The device of claim 9, wherein the compressed sensing algorithm comprises a $l_1$ norm of a reconstructed candidate data set that has been sparsified by applying a sparsifying operator as at least part of the target function that is to be iteratively minimized, wherein the boundary condition includes producing the first measurement data by applying to the candidate data set a measurement operator that maps measurement of the first measurement data.

11. The device of claim 9, wherein, for incorporation into the reconstruction, virtual measurement data of the first imaging modality is determined from the second measurement data, virtual measurement data of the second imaging modality is determined from the current candidate data set, and a virtual comparison data set of the first imaging modality, that is associated with the current candidate data set is determined from the second measurement data.

12. The device of claim 9, wherein the boundary condition includes a Radon transform applied to a three-dimensional X-ray attenuation value set that has been derived from a current candidate data set of the iterative optimization, and virtual projections that are obtained are compared with the second measurement data from the X-ray device.

13. The device of claim 9, wherein the boundary condition is a function of the sum of deviations of the magnetic resonance data from comparison data that results from applying a measurement operator that maps the measurement of the first image data and includes a Fourier transform onto the candidate data set, and the second measurement data of the virtual projections, lies within a tolerance range, the tolerance range selected as a function of the noise properties of the magnetic resonance data and the first measurement data.

14. The device of claim 9, wherein for the target function, either a comparison data set for the candidate data set is determined by reconstructing a three-dimensional intermediate data set from the second measurement data and mapping the attenuation values of the intermediate data set onto magnetic resonance values, or virtual projections are determined by applying a Radon transform to the three-dimensional X-ray attenuation value set that is derived from the current candidate data set of the iterative optimization procedure.

15. The device of claim 14, wherein the target function is defined as a weighted sum of a $l_1$ norm of a difference either between the candidate data set and the comparison data set or between the virtual projections and the second measurement data, to which difference a first sparsifying operator was applied, and a $l_1$ norm of the candidate data set, to which a second sparsifying operator was applied.

* * * * *